United States Patent
Mudrick et al.

(10) Patent No.: US 8,651,370 B1
(45) Date of Patent: Feb. 18, 2014

(54) SYSTEM FOR PROVIDING CODED PERSONALIZED SOUVENIRS

(71) Applicant: Orion Photo Industries, Inc., Prescott, AZ (US)

(72) Inventors: David Mudrick, Prescott, AZ (US); Sheldon Morick, Calabasas, CA (US)

(73) Assignee: Orion Photo Industries, Inc., Prescott, AZ (US)

( * ) Notice: Subject to any disclaimer, the term of this patent is extended or adjusted under 35 U.S.C. 154(b) by 0 days.

(21) Appl. No.: 13/892,022

(22) Filed: May 10, 2013

Related U.S. Application Data (60) Provisional application No. 61/645,211, filed on May 10, 2012.

(51) Int. Cl.
*G06F 17/00* (2006.01)
(52) U.S. Cl.
USPC ............................................ 235/375; 235/380
(58) Field of Classification Search
USPC .......................................... 235/375, 380, 383
See application file for complete search history.

(56) References Cited

U.S. PATENT DOCUMENTS

| | | | |
|---|---|---|---|
| 7,273,175 B2 | 9/2007 | Zhao et al. | |
| 7,734,499 B1 * | 6/2010 | Mudrick | 705/7.29 |
| 8,321,231 B2 * | 11/2012 | Torrens-Burton | 705/1.1 |
| 2009/0108057 A1 | 4/2009 | Mu et al. | |
| 2011/0085732 A1 | 4/2011 | Cheng | |
| 2012/0170870 A1 | 7/2012 | Mindrum et al. | |
| 2012/0206342 A1 | 8/2012 | Mindrum | |

OTHER PUBLICATIONS

U.S. Appl. No. 61/645,521, filed May 10, 2012.

* cited by examiner

*Primary Examiner* — Daniel St Cyr
(74) *Attorney, Agent, or Firm* — Santangelo Law Offices, P.C.

(57) ABSTRACT

The inventive technology disclosed herein relates to techniques, systems, methods and apparatus for providing coded souvenirs linked to web-based personalized content related to individual consumer identifiers, locality identifiers and/or both as well as to methods and apparatus for providing and servicing a coded personalized souvenir program. Additional embodiments also include laser engraved coded souvenirs.

21 Claims, 2 Drawing Sheets

SYSTEM FOR PROVIDING CODED PERSONALIZED SOUVENIRS

This application claims the benefit of and priority to U.S. Provisional Application No. 61/645,211 filed May, 10 2012. The entire specification and figures of the above-mentioned application is hereby incorporated, in its entirety by reference.

TECHNICAL FIELD

Generally, the inventive technology disclosed herein relates to techniques, systems, methods and apparatus for providing coded souvenirs linked to web-based personalized content which may further be associated with specific consumer identifiers, localities, as well as to methods and apparatus for providing and servicing a coded personalized souvenir program. Additional embodiments also include laser engraved coded personalized souvenirs.

BACKGROUND OF THE INVENTION

Personalized souvenirs and souvenir programs are known in the art. Such commercial items are generally directed to consumers visiting new or exciting destinations throughout the world, or attending a specific event or function, such as a concert or corporate gathering. In most instances such personalized souvenirs may include a personal or individual consumer identifier such as a name which may further be associated with another generic identifier of a location or event. Such personalized souvenirs not only appeal to consumers but can further be established as point-of-sale operations complete with display systems as well as inventory management provided by an outside vendor.

While such personalized souvenirs generally enjoy wide acceptance within the industry, as well as improved sales and margins, such personalized souvenirs and programs can be easily replicated by competitors. As such there exists a strong need within the industry to continually innovate to provide consumers not only a novel personalized product, but a unique personalized experience as well. Therefore it is an object of the current invention to provide, in some embodiments, individual quick response (QR) coded personalized souvenirs that may direct a consumer to an website containing information and other multi-media presentations of the souvenirs personalized aspects such as a name, geographic location or event and the like.

The foregoing problems regarding conventional personalized souvenir systems and processes may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

DETAILED DESCRIPTION OF THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In one embodiment, the current invention describes a method of providing a coded personalized souvenir. The terms souvenir may be applied broadly to commercial products, examples of such may include, but not limited to a: keyring souvenir; magnet souvenir; jewelry souvenir; toy souvenir; zipper pull souvenir; keychain souvenir; knife souvenir; decorative box souvenir; solar powered souvenir; cup souvenir; bottle souvenir; utensil souvenir; pen souvenir; pencil souvenir; tablet souvenir; case souvenir; sporting good; mobile phone case; tablet computer case souvenir; wooden souvenir; multi-tool souvenir; wood engravable souvenir; YooDara™ doll; carabineer souvenir; statute souvenir; frame souvenir; decorative souvenir and the like.

Additional steps of providing such coded personalized souvenirs may include one or more of the following steps: generating personalized content associated with at least one individual consumer identifier; populating at least one website with said personalized content with use of a computer device; generating at least one coded tag linked to said website through a pre-determined URL with use of a computer device; establishing at least one personalized souvenir wherein said personalized souvenir displays at least one of said individual consumer identifiers associated with said personalized content; associating said coded tag with said souvenir displaying said individual consumer identifier; presenting said plurality of personalized souvenirs in a manner that said personalized souvenirs present a coded tag that is accessible to be scanned by a mobile device; activating said coded tag through operation of said mobile device; decoding said coded tag; transmitting said website with said personalized content to said mobile device through operation of a server responsive to a network; and presenting said personalized content associated with at least one individual consumer identifier on a mobile device through a browser application.

Additional embodiments may further include method of providing a locality coded souvenir which may include one or more of the following steps: generating locality specific content associated with at least one locality; populating at least one website with said locality specific content with use of a computer device; generating at least one coded tag linked to said website through a pre-determined URL with use of a computer device; establishing at least one souvenir wherein said souvenir displays at least one locality identifier associated with said locality specific content; associating said coded tag with said souvenir displaying said locality identifier; presenting said plurality of souvenirs in a manner that said souvenirs present a coded tag that is accessible to be scanned by a mobile device; activating said coded tag through operation of said mobile device; decoding said coded tag; transmitting said website with said locality specific content to said mobile device through operation of a server responsive to a network; and presenting said locality specific content on a mobile device through a browser application. Various additional embodiments may be discuss and shown, both implicitly as well as explicitly below.

Figure 1:
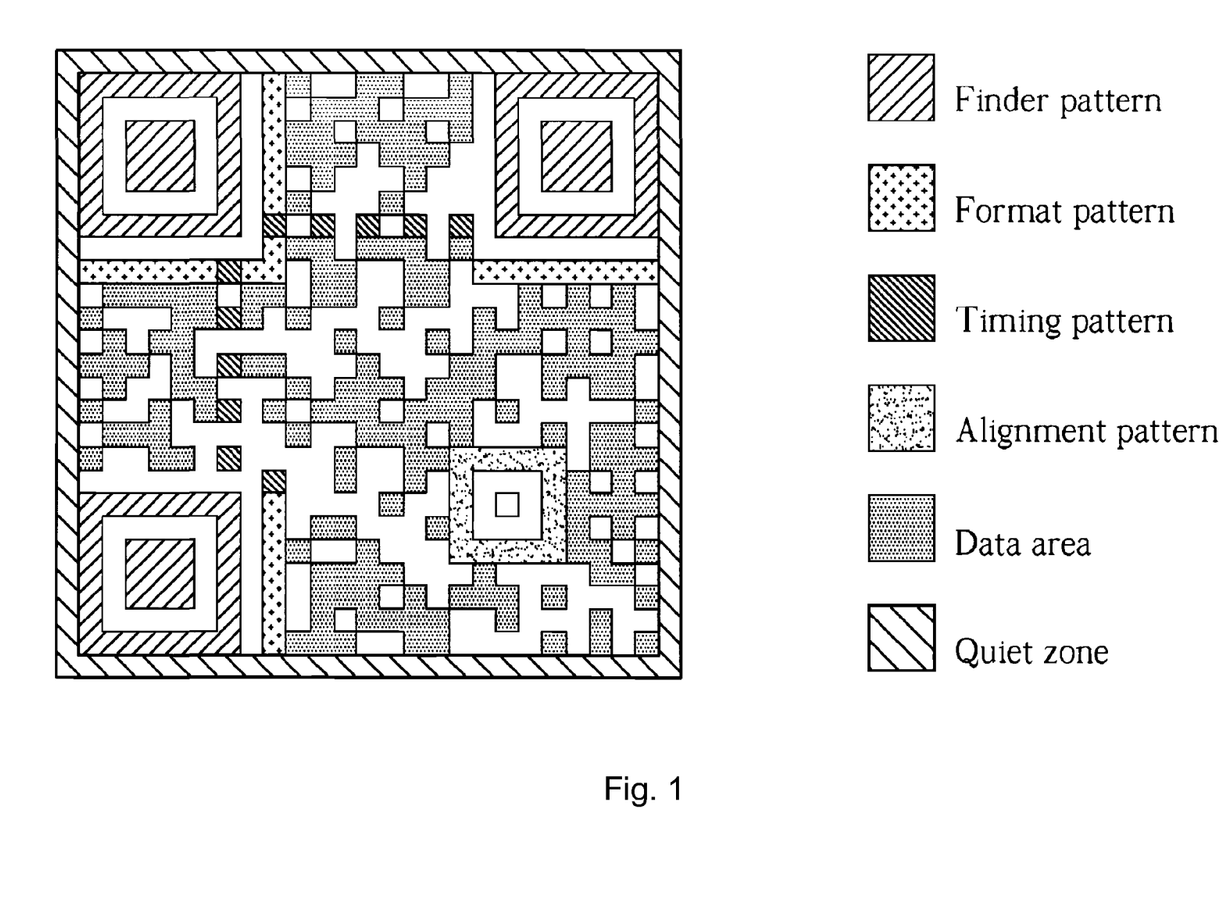
FIG. 1—is an exemplary diagram of a generic QR code highlighting its various regions.

Generally, as shown in FIG. 1 a QR code is a two-dimensional barcode (e.g., information provided in two dimensions). Such QR codes contain information in both vertical and horizontal directions, whereas traditional bar codes contain only data in one direction (i.e. horizontally).

Again, referring to FIG. 1,—which is a diagram of a conventional QR code—a normal QR code includes a finder pattern, an alignment pattern, a timing pattern, a quiet zone, a format area and a data area, wherein the finder pattern and the timing pattern are tools for positioning a QR code and determining its size, and the alignment pattern is for correcting errors resulting from identification. Such QR codes, or other mobile commercial tags such as Microsoft's High Capacity Color Barcode (HCCB), Universal Product Code (UPC), Datamatrix code; or a Portable Data File 417 code and others are generally known within the industry may be generated with use of a computer device, and as such their various embodiments are naturally contemplated in this application. As configured, a QR code can hold a greater volume of information than a bar code, and are often used to contain web addresses, messages, contact information, and the like. Commonly, commercial interests will place a QR code in an advertisement, which when activated by, for example, taking a picture of the QR code with a standard "smart phone" having a decoder application which can decode the image and automatically direct a consumer to a website or some other desired information. For example, a consumer may see an advertisement, or personalized souvenir associated with a QR code and takes a picture or video with their smart phone and a decoder in the phone can automatically direct the consumer to a website using the QR code. The commercial and marketing implications of such applications are obvious.

Figure 2:
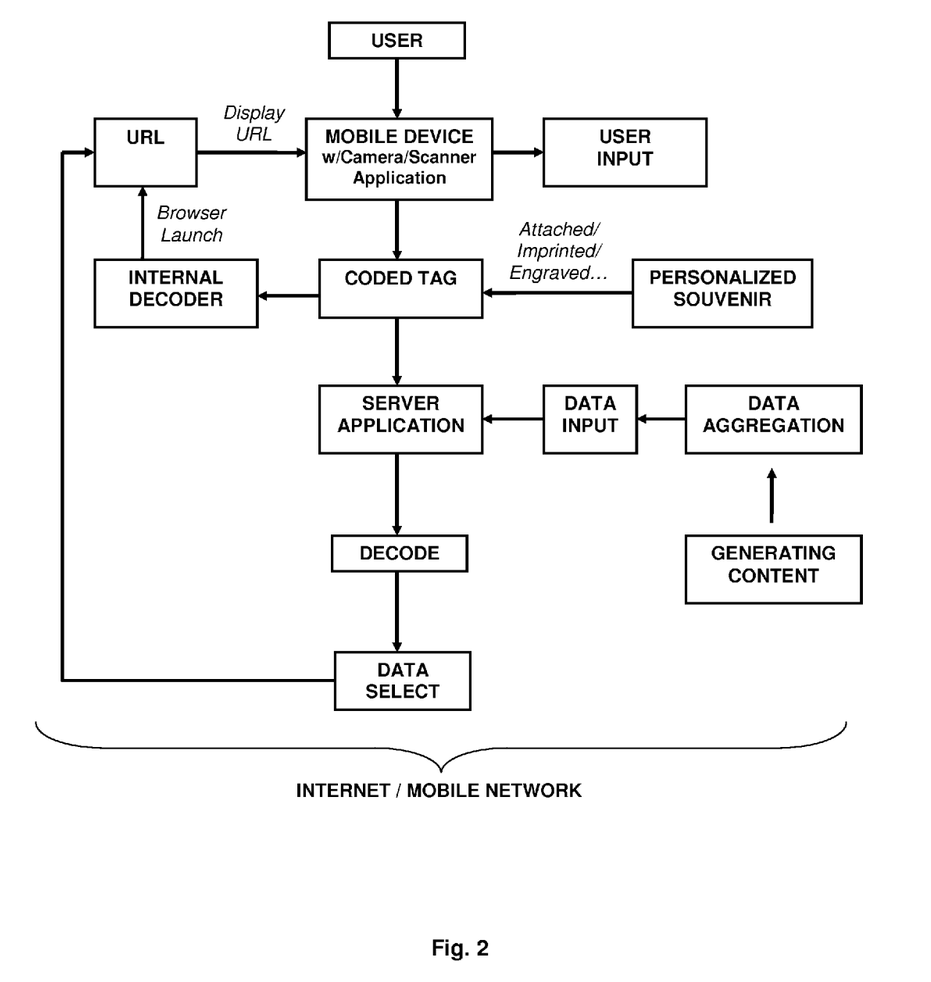
FIG. 2—is an exemplary flowchart diagram of the invention in one embodiment thereof.

Referring to FIG. 2, in a typical embodiment a personalized souvenir may be produced so as to present a personalized characteristic and a corresponding QR code directing a consumer to a pre-determined website containing personalized content. It should be noted that such personalized characteristic contemplates a variety of individual consumer of locality identifiers such as, but not limited to: names, locations, events, individual characteristics, individual characters, and any combination thereof. In one embodiment, a user may select a personalized souvenir with a corresponding personalized QR code. The user may activate the code by taking a picture or scanning the QR code using known smart phone technology. In certain embodiments, the user's phone may transmit the QR code data to a remote server or directly to specified "uniform resource locator" (URL), which then returns back a multimedia object, such as a personalized content presentation or perhaps a menu of additional choices. In other embodiments, known smart phone technology may allow such a QR code to be decoded locally rather than transferring the QR code to the server for interpretation. In such an embodiment, a user having a device, for example a camera telephone phone equipped with a reader and reader software can scan and decode the image of the QR code causing the phone's browser to launch and redirect to a programmed URL.

As generally shown in FIG. 2, in certain embodiments a user may utilize a device configured to scan a QR code. The device is operated by a user and includes and processes all applications corresponding to QR code recognition activities. These applications include a camera application for scanning the QR Code from a physical object. In another embodiment, QR code recognition processing is performed via a user device coupled to a server via a network to provide personalized content to the user's device. In these embodiments, users may use local processing devices, such as a smart phone, to communicate via one or more networks (e.g., Internet, wireless networks, wired networks, etc.) with a server supporting QR code recognition activities. In certain embodiment such a system supporting QR code recognition processing between a user's device and a server may occur via a network coupling. Such a system may include a network supporting QR code recognition. This network may include, for example, a mobile infrastructure comprising a user's device coupled or connected to one or more wired networks, wireless networks, the Internet, and other network types over which communication can occur. In certain embodiments, numerous users can each communicate with a server supporting QR code recognition services via the network, for example. In an embodiment, a user may, for example, utilize a mobile phone, personal digital assistant, personal computer, work station, or other device capable of scanning QR codes via an optical scanner to access the network and facilitate the to return of, or be redirected to pre-determined personalized content in the form of a URL.

In other embodiments, QR code recognition is performed via a user's device coupled to a server via a network to provide said personalized content. Generally referring to FIG. 2, a server may be configured to receive either decoded QR code data or packets of encoded QR codes from one or more users. In the latter case, the server may be configured to decode each of the accepted QR code packets as they are received in order to regenerate the original QR code, and store the original QR code into one or more buffers associated with the user transmitting the packets of encoded QR codes. The server may be configured to evaluate the QR code or QR code data from each of the user(s), and in response to transmit a respective personalized content, to for example a user's phone. In addition, a server may be configured to transmit a response to another user for display or use or to another server for additional processing.

It should be noted that such personalized content may be pre-established, aggregated or custom generated dependant on the specific need or desire of an end-user or point-of-sale purchaser. For example, a typical personalized name program may possess a pre-populated URL based QR code accessible server with personalized content related to the programs names. In another case, a point-of-sale vendor at a specific location may, for example, select a personalized program customized to that location wherein they could select: 1) a pre-populated; or 2) custom generated URL based QR code accessible personalized content. Further, the end purchaser of such a personalized program may customize the personalized content either independently or even direct a user to a desired third party website. In this sense, the current invention is superior to conventional personalized souvenir programs, such that the inventive technology provides a second layer of personalization to drive consumer interest and sales as well as create a "value-added" feature allowing for greater margins with a negligible corresponding incremental cost per souvenir.

In one embodiment of the inventive technology, a user, using a QR coded personalized souvenir configured to direct a user to personalized content, activates the QR code, via for example a smart phone which initiates an XML (eXtensible Markup Language) file comprising a web page for use in a QR code function. The QR code function of this embodiment includes a QR code processing function from the server supporting QR code recognition. The QR code function of an embodiment also includes use of the URL from the decoded QR code to return a personalized content in the form of, for example, a multi-media presentation or webpage to the user. In this instance the proper XML file corresponding to that personalized content is returned to the user from the server, via the Internet or wireless network, and the user's browser displays the text, graphics and multimedia data of the file on the user's screen. The user may then perform various interactive and/or inputting activities as described herein.

Certain embodiments contemplate a user scanning a QR code using a device such as a smart phone followed by either decoding and/or transmission of QR code data to a server for processing personalized content applications. The QR code includes information or indications of a command for a location on the web or a server that the user wishes to access. The device's decoder may send the QR code data request to the server supporting the QR code processing application and the URL from the decoded QR code via a network as herein discussed. In response to the transmission of the QR code by a user, the device may receive an XML file comprising a web page containing the personalized content from the server, and the user's device displays the text, graphics and multimedia data of the file to the user.

In one example embodiment, a consumer may purchase, for example, a personalized souvenir, such as a keychain which may be part of a larger personalized program. Such individual personalized souvenir may contain a corresponding QR code which may be activated by the consumer's smart phone directing them to a programmed URL that may include a multi-media or textual presentation of, for example:
1. Name origin
2. Trivia regarding name
3. Geographic origin of name
4. Name meaning or other name associated facts and/or trivia
5. Census data
6. Popularity and frequency of name use
7. Name translation in other languages
8. Famous or prominent figures with that name
9. Derivations of that name For example, in one embodiment, a consumer may purchase a personalized souvenir displaying the name "Susan." Through activation of the specific QR code presented on said personalized souvenir, a consumer may be directed to a URL that presents a multi-media and/or textual presentation containing the origins of the name Susan, trivia regarding the name Susan, popularity and frequency of the use of the name Susan, different translations of the name Susan and the like. In another embodiment, each personalized souvenir may have a single QR code for example which may direct a user to a specific URL. From there, a user may input a personalized content, in this case a name which will further direct the user to another URL specific to that personalized content.

In other embodiments, a consumer may purchase a locality coded souvenir specific to a location or landmark. Such individual personalized souvenir may contain a corresponding QR code which may be activated by the consumer's smart phone directing them to a programmed URL that may include a multi-media or textual presentation of, for example:
1. Historical facts or events related to that location or landmark
2. Trivia regarding that location or landmark
3. Pictures of that location or landmark
4. Interactive media presentations of that location or landmark
5. Guided tours of that location or landmark
6. Points of interest of that location or landmark or other nearby locations or landmarks
7. Points of interest related to that location or landmark For example, in one embodiment, a consumer may purchase a personalized souvenir specific to the statue of liberty. Through activation of the specific QR code a consumer may be directed to a URL code that presents a multi-media and/or textual presentation containing historical facts or events related to the statue of liberty, pictures of the statue of liberty, trivia regarding the statue of liberty, or even a guided tour of the statue of liberty and the like.

In still other embodiments, a consumer may purchase a personalized souvenir specific to an event, such as a corporate retreat or a concert. Such individual personalized souvenir may contain a corresponding QR code which may be activated by the consumer's smart phone directing them to a programmed URL that may include a multi-media or textual presentation of, for example:
1. Informational presentation of that event
2. Promotional materials related to that event
3. Contest information related to that event
4. Itinerary or schedule of that event
5. Historical facts or events related to that event
6. Trivia regarding that event
7. Pictures of the event or past similar events
8. Interactive media presentations of that event
9. Map of that event
10. Guided tours of that event or activities within that event
11. Group of individual interactive "scrap-book" pages where users may individually upload personalized content in the form of photos, video, comments and the like In still other embodiments, a consumer may purchase a personalized souvenir containing a corresponding QR code which may be activated by the consumer's smart phone directing them to a programmed URL that may include a digital interface where a user may input additional individual consumer identifiers such as:
1. Birthday
2. Anniversary
3. Any other significant date
4. Personal characteristics such as hair color, height, weight, left or right handed and the like In certain embodiments, such personalized content entered by a consumer may in turn display corresponding personalized content related to that inputted data, such as:
1. Events that occurred on the consumer's birthday or other date or year
2. Zodiac information
3. Horoscope (daily, weekly, monthly, yearly)
4. Birth stone
5. Birth location historical information
6. Significant events that occurred on the selected date
7. Famous persons with relationship to the selected date and/or event
8. Family history and/or lineage, family name origination, family name definition, family crest and the like based on last name
9. Daily affirmation and motivational sayings that the consumer could access through activation of the QR code each day 10. Daily lucky numbers, colors, lucky quote received based on consumer selected date or that the consumer could access through activation of the QR code each day
11. Personalized history of the souvenir, for example the personalized history and characteristics of a specific YooDara™ doll It should be noted that such personalized content presentation may be construed broadly and is expressly not limited to the above represented categories. It should be understood that a large variety of potential personalized content is contemplated in the current inventive technology. In addition, various embodiments may include a mix of personal characteristics which may have multiple or single QR code directed personalized content. For example, a consumer may purchase a personalized souvenir specific to a zoo or aquarium. In that instance, in some embodiments such a personalized souvenir may contain a personalized animal or location characteristic. Such an individually personalized "animal" souvenir may contain a corresponding QR code specific to a corresponding personalized "zoo-based" website which may be activated by the consumer's smart phone directing them to a programmed URL that may include a multi-media or textual presentation of, for example 1. Statistics regarding a specific animal that may be presented on the souvenir
2. Name and facts of a particular animal such as Shamu™ the killer whale
3. Origination of breed
4. Popularity of that animal
5. Photos of that animal
6. Breed details including colors, size, temperament,
7. Information regarding animal attraction
8. That particular business' proprietary website
9. Establishment's schedule/promotions/special events It should be noted that numerous types of personalized content are contemplated in the current invention and should be construed broadly. In that sense, any specific location, event, personal characteristic, fact, game, good and/or service, direction, product, product specification, advertising, marketing material, literary work, artwork, educational information, or any general information may be tailored to constitute personalized content related to a specific souvenir. Moreover, as discussed above, certain embodiments of the invention may encompass a coded personalized program which may generally comprise the steps of selecting names for the personalization of a souvenir such as through a computer device, contacting a souvenir retailer, preparing artwork preferably related to the personal characteristic and/or content, creating QR code, generating accessible personalized content, providing a rack to the souvenir retailer to display the personalized souvenirs, and servicing the rack to ensure that its inventory is properly maintained perhaps involving a computer.

The first step to determine the names to include for name personalization is to establish the age range of the demographic that will be purchasing the souvenirs. In the preferred embodiment of the invention, the age range is 5 years to 35 years. These are the individuals that are most likely to purchase or receive the personalized souvenirs. Once the age range is established, the census and birth records of the established age range are researched to determine the most popular first names of those years. In addition to the most common names of the age range, the most popular names of all time are also included. The top names are selected and used in the personalization program. In a preferred embodiment, the top 300 names are used. Additionally, it is preferred that the inventory of personalized souvenirs is based upon the popularity of the names where there is a ratio of 15:1 from the most popular name to the least popular name. In other words, there are 15 souvenirs with the most popular name to every 1 souvenir with the least popular name. Preferably, a sales representative contacts the souvenir retailers and provides information including pricing, samples of products, services offered, personalized content available, as well as options to customize the personalizable content and specific QR code directed URL display and the like. Once the souvenir retailer decides to purchase the personalized souvenir program, the parties enter into a contract establishing the terms of the delivery and service of the souvenirs, personalized content, and the price paid by the souvenir retailer.

Next, in some embodiments, the souvenir retailer may decide on the type of artwork that will be included on the personalized souvenirs such as a keychain. It is preferable that the artwork has a connection to the souvenir retailer's geographical location or venue. However, in an alternate embodiment, the souvenir retailer could be an organization that wishes for its logo to be depicted on the personalized souvenir. In either case, the souvenir retailer can provide the artwork to the sales representative or request that the artwork be designed by the sales representative's employer. The art work may incorporate the QR code as well. Once the artwork is prepared, it is subject to the final approval of the souvenir retailer before the personalized souvenirs are manufactured.

In an alternate embodiment of the invention, the inventory and personalized content is electronically monitored such as with a computer device. In one embodiment, each souvenir may have a universal product code (UPC) that corresponds to, for example, the particular name on the souvenir. Every time a souvenir is purchased, the information is captured electronically such as with a computer device allowing an individual to know which names to re-stock. In a further alternate embodiment of the invention, the souvenirs and/or the souvenir rack includes a radio frequency identification ("RFID") system. The RFID system aids in the supply chain management of the souvenir inventory. Specifically, this type of service can reduce the number of times a service representative actually makes a visit to a site, which ultimately increases the profit of the souvenir retailer. The information received and stored by the RFID system is transmitted to the souvenir supplier in real time such as with a computer device and provides an up to date inventory of the products on the rack. In certain embodiments, a QR coded personalized souvenir may allow a consumer to purchase a souvenir and activate the QR code which can transmit data to a central server providing information as to the location of the sale, as well as allowing the consumer to enter certain demo/geographic information which can be further used to enhance targeted marketing efforts.

In a further alternate embodiment, the QR code acts as an inventory monitoring device that is coupled to the souvenir. In this embodiment, a unique QR code corresponds to each personalized name such that the inventory is computer monitored upon a souvenir being purchased. The use of a radio frequency identification system and UPC, and QR code as the inventory monitoring devices are just three embodiments. In fact, the inventory monitoring device could be a computer device or any type of device or system that efficiently tracks and manages the souvenir inventory.

In certain embodiments, as discussed previously, said personalized content may be aggregated and pre-populated to a specific accessible URL or server based host. Such personalized content may be continually updateable, as well as updateable through interaction with the user. For example, a user activating a QR code may be directed to certain personalized content which prompts them to input additional personalized content such as personal and demographic information, textual messages, photos or other interactive media presentations. In certain embodiments, as personalized souvenirs are generally found at vacation or event destinations, a user may purchase such a personalized souvenir and activate a QR code directing them to a group or individual "scrap book" page for that location or event allowing the user to create and upload personalized content such a textual messages, comments, photos or other interactive media presentations, suggestions to other consumers of interesting places to visit and the like. Such user generated personalized content may be private, or publically accessible. It should also be appreciated that the invention contains embodiments whereby such personalized content may be used to facilitate advertising, directed marketing, product/warranty information, product registration as well as promotion based games and "give-a-ways."

Various embodiments of the inventive technology may include novel QR code presentations. Traditional sticker, decal and/or tag based QR codes are contemplated, as well as engraved QR codes which may be associated with a specific souvenir or perhaps even a display, such as a rack or bin holding said souvenirs. For example, in some embodiments such a QR code may be engraved directly to the outer surface of the personalized souvenir. In one embodiment, a QR code may be laser engraved into surface of a wooden souvenir using laser engraving technologies known in the industry. Such quick laser engraving, apart from being novel, allows for a more permanent QR code which can facilitate multiple activations as opposed to traditional sticker/tag based QR codes transiently attached to products. It should also be noted that such engraving embodiments also encompass engraving QR codes onto various material such as metal, plastics and composite materials. Further, such QR codes may be imprinted and/or directly integrated onto the surface of various souvenirs, for example plastic casings. Such imprints and integrated QR codes may utilize various colors, shading, materials, and configuration to maximize functionality.

Additional embodiments of the current invention may include a personalized souvenir program having a QR coded support or rack system. In one example, a personalized name based keychain souvenir may be presented on a single or multiple rack system. In this instance there may be multiple names or other personalized aspects available to the customer. As such, a QR code may be affixed to the rack itself allowing a potential consumer to quickly determine if, for example, their name is present or provide information about the product, vendor or specific location or event. Such inventory description may be continually updated by the vendor or point-of-purchase establishment. In addition, if a potential consumer desires a personalized name or other content, such as perhaps a personalized slogan that is not present, he/she may interactively submit that information which may be redirected back to the vendor to better facilitate personalized content generation by geographic region and even point-of-sale location.

Naturally as can be appreciated, all of the steps as herein described may be accomplished in some embodiments through any appropriate machine and/or device resulting in the transformation of, for example souvenir configuration, data, personalized content, inventory content and presentation as well as personalized characteristics. It should also be noted that in some instances software and/or software solution may be utilized to carry out the objectives of the invention and may be defined as software stored on a magnetic or optical disk or other appropriate physical computer readable media including wireless devices and/or smart phones. In alternative embodiments the software and/or data structures can be associated in combination with a computer or processor that operates on the data structure or utilizes the software. Further embodiments may include transmitting and/or loading and or updating of the software on a computer perhaps remotely over the internet or through any other appropriate transmission machine or device, or even the executing of the software on a computer resulting in the data and/or other physical transformations as herein described.

Certain embodiments of the inventive technology may utilize a machine and/or device which may include a general purpose computer, a computer that can perform an algorithm, computer readable medium, software, computer readable medium continuing specific programming, a computer network, a server and receiver network, transmission elements, wireless devices and/or smart phones, internet transmission and receiving element; software updateable elements; computer routines and or subroutines, computer readable memory, data storage elements, random access memory elements, and/or computer interface displays that may represent the data in a physically perceivable transformation such as visually displaying said processed data. In addition, as can be naturally appreciated, any of the steps as herein described may be accomplished in some embodiments through a variety of hardware applications including a keyboard, mouse, computer graphical interface, voice activation or input, server, receiver and any other appropriate hardware device known by those of ordinary skill in the art.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system for providing personalized souvenirs and the like. In this application, the instrument sterilization techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention.

Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "code" should be understood to encompass disclosure of the act of "coding"—whether explicitly discussed or not—and, conversely, were there effectively disclosure of the act of "coding", such a disclosure should be understood to encompass disclosure of a "coding method and/or technique, and or device" and even a "means for coding". Such changes and alternative terms are to be understood to be explicitly included in the description.

Any patents, publications, or other references mentioned in this application for patent are hereby incorporated herein by reference in their entirety. Any priority case(s) claimed by this application is hereby appended and hereby incorporated herein by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The Patent Application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the system (with corresponding methods and apparatus) of providing coded personalized souvenirs as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

In addition and as to computer aspects and each aspect amenable to programming or other electronic automation, the applicant(s) should be understood to have support to claim and make a statement of invention to at least: xvi) processes performed with the aid of or on a computer and or controller as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim* v. *Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

What is claimed is:

1. A method of providing a coded personalized souvenir comprising the steps of:

generating personalized content associated with at least one individual consumer identifier;

populating at least one website with said personalized content with use of a computer device;

generating at least one coded tag linked to said website through a pre-determined URL with use of a computer device;

establishing at least one personalized souvenir wherein said personalized souvenir displays at least one of said individual consumer identifiers associated with said personalized content;

associating said coded tag with said souvenir displaying said individual consumer identifier;

presenting said personalized souvenir in a manner that said personalized souvenir presents a coded tag that is accessible to be scanned by a mobile device;

activating said coded tag through operation of said mobile device;

decoding said coded tag;

transmitting said website with said personalized content to said mobile device through operation of a server responsive to a network; and presenting said personalized content associated with at least one individual consumer identifier on a mobile device through a browser application.

2. A method of providing a coded personalized souvenir as described in claim 1 wherein said step of generating personalized content comprises the step of generating personalized content associated with at least one individual consumer identifier selected from the group consisting of: generating a plurality of names; generating name origins associated with at least one individual consumer identifier; generating trivia associated with at least one individual consumer identifier; generating geographic origins associated with at least one individual consumer identifier; generating name meanings; generating name associated facts and/or trivia; generating census data; generating popularity of name use; generating frequency of name use; generating name translations in other languages; generating famous or prominent figures associated with at least one individual consumer identifier; generating derivations of a name; generating events that occurred on a consumer's birthday; generating zodiac information; generating birth stone information; generating birth location information; generating historical information; generating significant events that occurred on a selected date; generating famous persons with relationship to at least one individual consumer identifier; generating family history and/or lineage; generating family name origination, generating family name definition; generating family crest; generating daily affirmation and/or motivational sayings; generating daily lucky numbers, generating colors; generating lucky and/or inspirational quotes; generating personalized history of a souvenir; and generating biographical history and/or characteristics of a specific YooDara™ doll.

3. A method of providing a coded personalized souvenir as described in claim 1 wherein said step of establishing at least one personalized souvenir wherein said personalized souvenir displays at least one of said individual consumer identifiers associated with said personalized content comprises the step of establishing at least one personalized souvenir wherein said personalized souvenir displays at least one of said individual consumer identifiers associated with said personalized content selected from the group consisting of:
 establishing at least one personalized souvenir displaying at least one name;
 establishing at least one personalized souvenir displaying at least one nickname;
 establishing at least one personalized souvenir displaying at least one most popular name within a selected age demographic;
 establishing at least one personalized souvenir displaying at least one of the most popular names within a population;
 establishing at least one personalized souvenir displaying at least one date;
 establishing at least one personalized souvenir displaying at least one personal characteristic;
 establishing at least one personalized souvenir displaying at least one gender characteristic;
 establishing at least one personalized souvenir displaying at least one color;
 establishing at least one personalized souvenir displaying at least one generic slogan; and
 establishing at least one personalized souvenir displaying at least one professional characteristic.

4. A method of providing a coded personalized souvenir as described in claim 1 wherein said step of generating at least one coded tag comprises the step of generating at least one coded tag selected from the group consisting of: generating at least one Quick Response Code (QR); generating at least one Universal Product Code (UPC); generating at least one High Capacity Color Barcode (HCCB); generating at least one Datamatrix code; and generating at least one Portable Data File 417 code.

5. A method of providing a coded personalized souvenir as described in claim 1 wherein said step of associating said coded tag with said souvenir displaying said individual consumer identifier comprises the step selected from the group consisting of: laser engraving said coded tag onto said souvenir; attaching a label displaying said coded tag onto said souvenir; etching said coded tag onto said souvenir; laser-etching said coded tag onto said souvenir; attaching artwork incorporating said coded tag onto said souvenir; molding said coded tag into said souvenir; imprinting said coded tag onto said souvenir; attaching a sales tag with said coded tag to said souvenir; attaching a sales tag with said coded tag to a display holding said souvenir; attaching a label with said coded tag to a display holding said souvenir; laser engraving said coded tag to a display holding said souvenir.

6. A method of providing a coded personalized souvenir as described in claim 1 wherein said step of decoding said coded tag comprises the step of decoding said coded tag selected from the group consisting of: internally decoding said coded tag; externally decoding said coded tag through a network coupling.

7. A method of providing a coded personalized souvenir as described in claim 1 wherein said step of presenting said personalized content comprises the step of presenting said personalized content in an interactive format.

8. A method of providing a coded personalized souvenir as described in claim 1 wherein said step of populating at least one website with said personalized content comprises the step of populating at least one website with said personalized content by a point of sale operator.

9. A method of providing a locality coded souvenir comprising the steps of:
 generating locality specific content associated with at least one locality;
 populating at least one website with said locality specific content with use of a computer device;
 generating at least one coded tag linked to said website through a pre-determined URL with use of a computer device;
 establishing at least one souvenir wherein said souvenir displays at least one locality identifier associated with said locality specific content;
 associating said coded tag with said souvenir displaying said locality identifier;
 presenting said souvenir in a manner that said souvenir presents a coded tag that is accessible to be scanned by a mobile device;
 activating said coded tag through operation of said mobile device;
 decoding said coded tag;
 transmitting said website with said locality specific content to said mobile device through operation of a server responsive to a network; and
 presenting said locality specific content on a mobile device through a browser application.

10. A method of providing a locality coded souvenir as described in claim 9 wherein said step of generating locality specific content associated with at least one locality comprises the step selected from the group consisting of: generating historical facts and/or events with at least one locality; generating trivia corresponding to with at least one locality; generating pictures of at least one locality; generating a map of at least one locality; generating interactive media presentations of at least one locality; generating guided tours of at least one locality; generating points of interest of at least one locality; generating social media links to at least one locality; generating informational presentation of at least one event; generating promotional materials related at least one event; generating contest information related at least one event; generating itinerary and/or schedule information related at least one event; generating historical facts related to at least one event; generating trivia related to at least one event; generating pictures of at least one event; generating pictures of past similar events; generating interactive media presentations of at least one event; generating a map of at least one event; generating guided tours of at least one event; generating at least one individual interactive website where users may individually upload personalized content related to at least one event and/or locality; generating video to at least one event and/or locality; generating social media links to at least one event and/or locality; generating scheduling information related to at least one event and/or locality; and generating promotional information related to at least one event and/or locality.

11. A method of providing a locality coded souvenir as described in claim 9 wherein said step of establishing at least one souvenir wherein said souvenir displays at least one locality identifier associated with said locality specific content comprises the step selected from the group consisting of: establishing at least one souvenir wherein said souvenir displays a geographic location identifier; establishing at least one souvenir wherein said souvenir displays a landmark identifier; establishing at least one souvenir wherein said souvenir displays a monument identifier; establishing at least one souvenir wherein said souvenir displays an attraction identifier; establishing at least one souvenir wherein said souvenir displays an event identifier; establishing at least one souvenir wherein said souvenir displays a corporate logo identifier; establishing at least one souvenir wherein said souvenir displays a commercial product identifier; and establishing at least one souvenir wherein said souvenir displays an advertisement.

12. A method of providing a locality coded souvenir as described in claim 9 wherein said step of generating at least one coded tag linked to said website through a pre-determined URL with use of a computer device comprises the step of generating at least one coded tag selected from the group consisting of: generating at least one Quick Response Code (QR); generating at least one Universal Product Code (UPC); generating at least one High Capacity Color Barcode (HCCB); generating at least one Datamatrix code; and generating at least one Portable Data File 417 code.

13. A method of providing a locality coded souvenir as described in claim 9 wherein said step of associating said coded tag with said souvenir displaying said locality identifier comprises the step selected from the group consisting of: laser engraving said coded tag onto said souvenir; attaching a label displaying said coded tag onto said souvenir; etching said coded tag onto said souvenir; laser-etching said coded tag onto said souvenir; attaching artwork incorporating said coded tag onto said souvenir; molding said coded tag onto said souvenir; imprinting said coded tag onto said souvenir; attaching a sales tag with said coded tag to said souvenir; attaching a sales tag with said coded tag to a display holding said souvenir; attaching a label with said coded tag to a display holding said souvenir; laser engraving said coded tag to a display holding said souvenir.

14. A method of providing a locality coded souvenir as described in claim 9 wherein said step of decoding said coded tag comprises the step of decoding said coded tag selected from the group consisting of: internally decoding said coded tag; externally decoding said coded tag through a network coupling.

15. A method of providing a locality coded souvenir as described in claim 9 wherein said step of presenting said locality specific content comprises the step of presenting said locality specific content in an interactive format.

16. A method of providing a locality coded souvenir as described in claim 9 wherein said step of populating at least one website with said locality specific content comprises the step of populating at least one website with said locality specific content by a point of sale operator.

17. A method of providing a locality coded personalized souvenir comprising the steps of:
generating personalized content associated with at least one individual consumer identifier;
generating locality specific content associated with at least one locality;
populating at least one website with said personalized content and said locality specific content with use of a computer device;
generating at least one coded tag linked to said website through a pre-determined URL with use of a computer device;
establishing at least one locality coded personalized souvenir wherein said locality coded personalized souvenir displays at least one of said individual consumer identifiers associated with said personalized content and at least one locality identifier associated with said locality specific content;
associating said coded tag with said locality coded personalized souvenir;
presenting said locality coded personalized souvenir in a manner that said locality coded personalized souvenir presents a coded tag that is accessible to be scanned by a mobile device;
activating said coded tag through operation of said mobile device;
decoding said coded tag;
transmitting said website with said personalized content and/or said locality specific content to said mobile device through operation of a server responsive to a network; and
presenting said personalized content associated with at least one individual consumer identifier and/or presenting locality specific content associated with at least one locality on a mobile device through a browser application.

18. A method of providing a locality coded personalized souvenir as described in claim 17 wherein said step of generating personalized content comprises the step of generating personalized content associated with at least one individual consumer identifier selected from the group consisting of: generating a plurality of names; generating name origins associated with at least one individual consumer identifier; generating trivia associated with at least one individual consumer identifier; generating geographic origins associated with at least one individual consumer identifier; generating name meanings; generating name associated facts and/or trivia; generating census data; generating popularity of name use; generating frequency of name use; generating name translations in other languages; generating famous or prominent figures associated with at least one individual consumer identifier; generating derivations of a name; generating events that occurred on a selected date; generating zodiac information; generating horoscope information; generating birth stone information; generating birth location information; generating historical information; generating significant events that occurred on a selected date; generating famous persons with relationship to at least one individual consumer identifier; generating family history and/or lineage; generating family name origination, generating family name definition; generating family crest; generating daily affirmation and/or motivational sayings; generating daily lucky numbers, generating colors; generating lucky and/or inspirational quotes; generating personalized history of a souvenir; and generating biographical history and/or characteristics of a specific YooDara™ doll.

19. A method of providing a locality coded personalized souvenir as described in claim 17 wherein said step of establishing at least one locality coded personalized souvenir wherein said locality coded personalized souvenir comprises the step of establishing at least one locality coded personalized souvenir wherein said locality coded personalized souvenir displays at least one of said individual consumer identifiers associated with said personalized content selected from the group consisting of:
establishing at least one personalized souvenir displaying at least one name;
establishing at least one personalized souvenir displaying at least one nickname;
establishing at least one personalized souvenir displaying at least one most popular name within an age demographic age demographic;

establishing at least one personalized souvenir displaying at least one of the most popular names within a population;

establishing at least one personalized souvenir displaying at least one date;

establishing at least one personalized souvenir displaying at least one personal characteristic;

establishing at least one personalized souvenir displaying at least one gender characteristic;

establishing at least one personalized souvenir displaying at least one color;

establishing at least one personalized souvenir displaying at least one generic slogan; and establishing at least one personalized souvenir displaying at least one professional characteristic.

20. A method of providing a locality coded personalized souvenir as described in claim 17 wherein said step of generating locality specific content associated with at least one locality comprises the step selected from the group consisting of: generating historical facts and/or events with at least one locality; generating trivia corresponding to with at least one locality; generating pictures of at least one locality; generating a map of at least one locality; generating interactive media presentations of at least one locality; generating guided tours of at least one locality; generating points of interest of at least one locality; generating social media links to at least one locality; generating informational presentation at least one event; generating promotional materials related at least one event; generating contest information related at least one event; generating itinerary and/or schedule information related at least one event; generating historical facts related to at least one event; generating trivia related to at least one event; generating pictures of at least one event; generating pictures of past similar events; generating interactive media presentations of at least one event; generating a map of at least one event; generating guided tours of at least one event; generating at least one individual interactive website where users may individually upload personalized content related to at least one event and/or locality; generating video to at least one event and/or locality; generating social media links to at least one event and/or locality; generating scheduling information related to at least one event and/or locality; and generating promotional information related to at least one event and/or locality.

21. A method of providing a locality coded personalized souvenir as described in claim 17 wherein said step of establishing at least one locality coded personalized souvenir wherein said locality coded personalized souvenir comprises the step selected from the group consisting of: establishing at least one souvenir wherein said souvenir displays a geographic location identifier; establishing at least one souvenir wherein said souvenir displays a landmark identifier; establishing at least one souvenir wherein said souvenir displays a monument identifier; establishing at least one souvenir wherein said souvenir displays an attraction identifier; establishing at least one souvenir wherein said souvenir displays an event identifier; establishing at least one souvenir wherein said souvenir displays a corporate logo identifier; establishing at least one souvenir wherein said souvenir displays a commercial product identifier; and establishing at least one souvenir wherein said souvenir displays an advertisement.

* * * * *